Patented Dec. 1, 1936

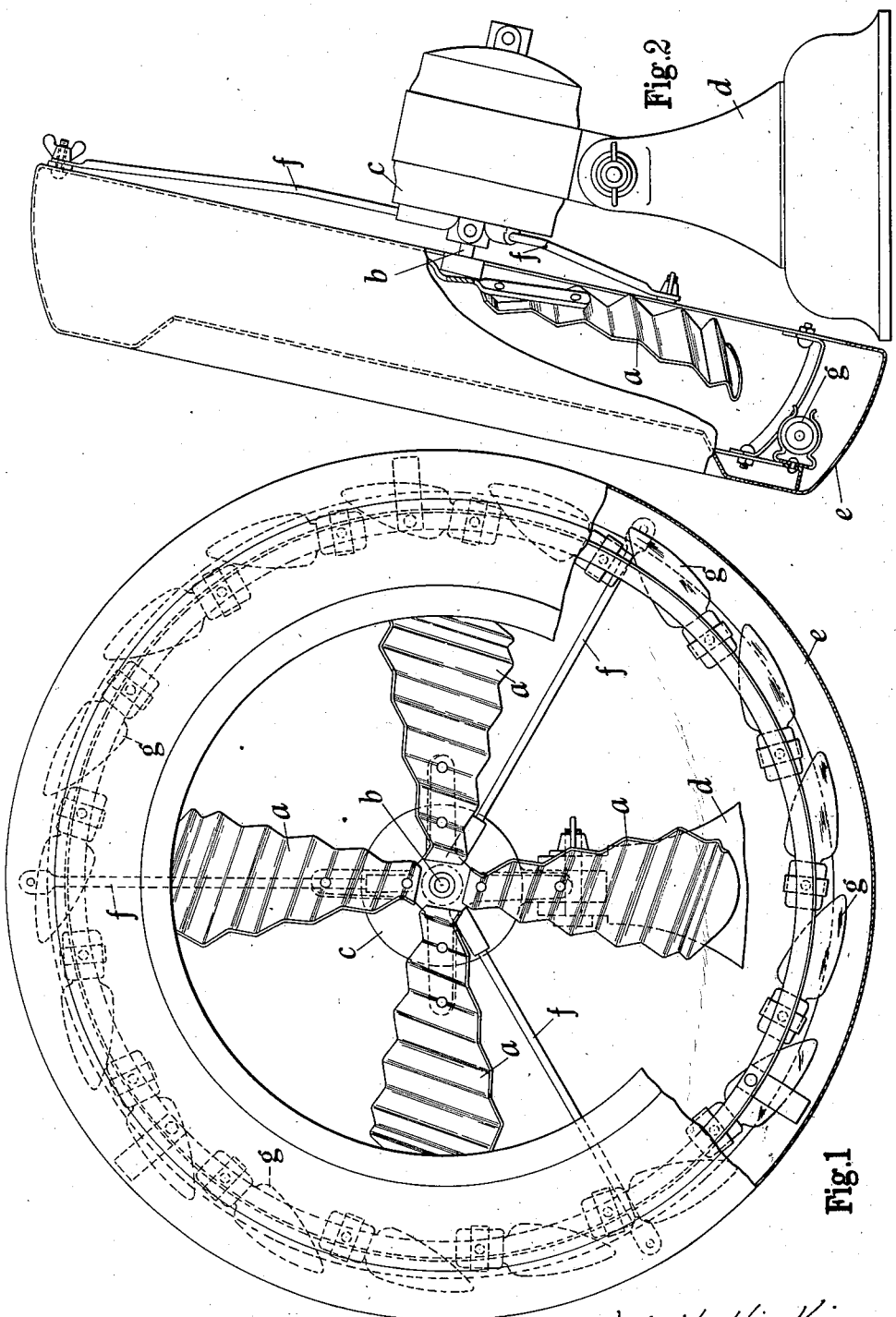

2,062,513

UNITED STATES PATENT OFFICE 2,062,513

VENTILATING FAN

William Hardy Hipkiss, Quinton, Birmingham, England

Application July 18, 1935, Serial No. 32,108
In Great Britain July 26, 1934

2 Claims. (Cl. 230—249.5)

This invention relates to electrically driven rotary ventilating fans, and has for its object to enable such fans to be made readily visible when in motion in a darkened room, such as a theatre, or to form an attractive feature when used in a shop window or on a counter.

The invention comprises the combination with the fan structure, of an electric lamp or lamps so arranged as to illuminate the fan blades.

In the accompanying sheet of explanatory drawing:—

Figure 1 is a front elevation with part in section, and Figure 2 a side elevation with part in section of a fan constructed in accordance with this invention.

In carrying the invention into effect in the manner shown, I employ a fan comprising a plurality of radial blades $a$ carried on a spindle $b$ which is driven by an electric motor $c$, the latter being supported on any convenient stand $d$. Preferably the blades are corrugated transversely and are polished to enhance their light reflecting property.

At the front of and around the fan there is mounted an annular sheet metal shield $e$. This is carried on the body of the motor by arms $f$, and within the shield are arranged a plurality of small electric lamp bulbs $g$. These are preferably made of different colours, and are so mounted as to illuminate the front surfaces of the fan blades. The lamp circuits may be controlled by the same switch as the fan or by a separate switch.

The invention is not limited to the example above described, as subordinate details can be varied to suit different requirements. By arranging the lights to give direct or indirect illumination of the fronts of the moving blades I am able to produce pleasing optical effects which serve to indicate to an audience in, for example, a theatre or other darkened room that the fan is working, or to attract attention when the fan is used as an advertising device in a shop or other like place.

Having thus described my invention what I claim as new and desire to secure by Letters Patent is:—

1. In ventilating fans, the combination of a fan having a plurality of blades which are transversely corrugated, an annular shield arranged in front of and around the fan so that the front of the fan blades is visible through the opening in the annular shield, and a plurality of electric lamps arranged to illuminate the front of the fan blades and mounted behind the shield so that the front of the lamps is concealed and the optical effects produced by the illumination of the fan blades is unaffected by direct glare from the front of the lamps, substantially as described.

2. In ventilating fans, the combination of a fan having a plurality of radial blades which are transversely corrugated, an electric motor for driving the fan, a support for the motor, an annular shield arranged in front of and around the fan so that the front of the fan blades is visible through the opening in the annular shield, said shield being carried by the motor, and a plurality of differently coloured electric lamps arranged to illuminate the front of the fan blades and mounted within the shield so that the front of the lamps is concealed and the optical effects produced by the illumination of the fan blades is unaffected by the direct glare from the front of the lamps, substantially as described.

WILLIAM HARDY HIPKISS.